May 25, 1954
W. A. PITMAN
2,679,468
BONDED METAL-TO-METAL LAP JOINTS
AND METHOD OF MAKING THE SAME
Filed Sept. 23, 1950
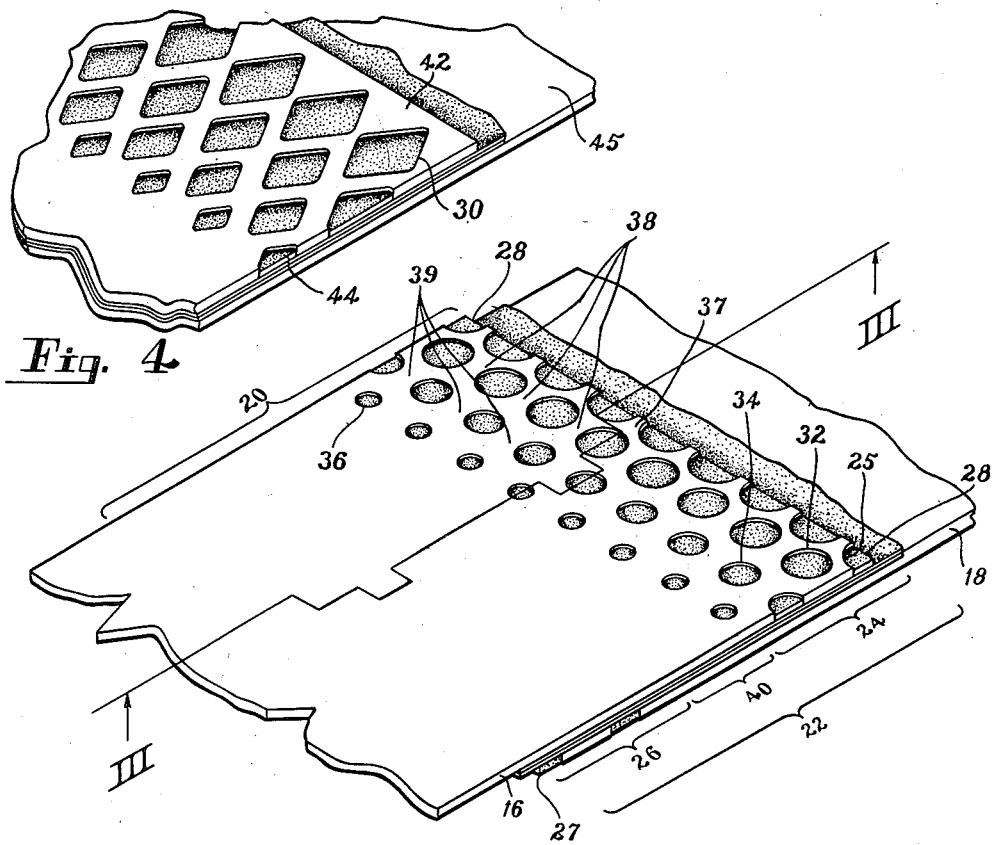
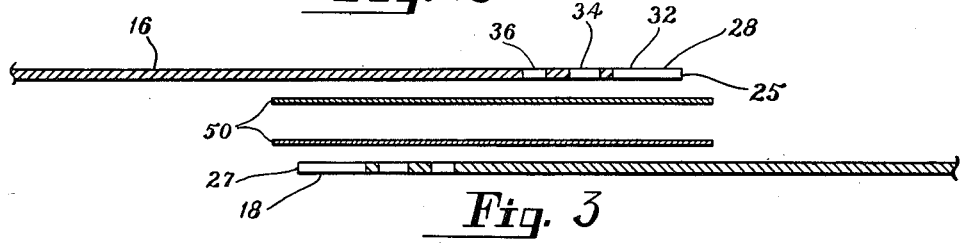
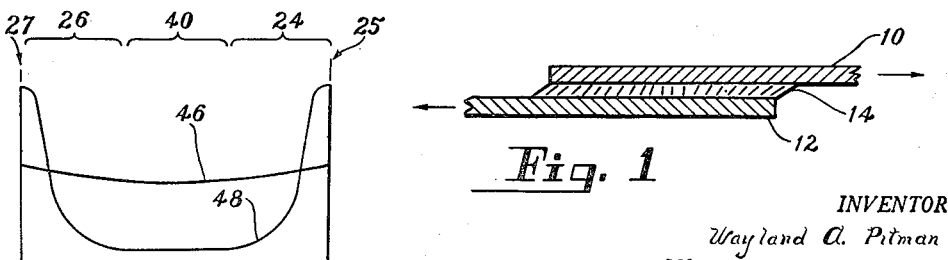
INVENTOR.
Wayland A. Pitman
BY Ernest A. Wood
Attorney

Patented May 25, 1954

2,679,468

UNITED STATES PATENT OFFICE 2,679,468

BONDED METAL-TO-METAL LAP JOINTS AND METHOD OF MAKING THE SAME

Wayland A. Pitman, Dallas, Tex., assignor, by mesne assignments, to Chance Vought Aircraft, Incorporated, a corporation of Delaware Application September 23, 1950, Serial No. 186,353

8 Claims. (Cl. 154—116)

This invention relates to bonded metal-to-metal lap joints and to a method of making the same.

The recent developments of high strength adhesives have encouraged the use of bonded metal structural joints, especially in aircraft, since bonded joints can be more easily made than riveted or welded joints and they result in a smoother, lighter assembly, which advantages are of basic importance in aircraft. It has been found, however, that the ordinary bonded metal lap joints have a tendency to become weaker at lower temperatures, such as those encountered by airplanes flying at high altitudes, which endangers the structural integrity of the joint. The reason for the weakening of conventional bonded metal joints at low temperatures is that the distribution of stress across the joint is non-uniform. Where two pieces of metal are overlapped to form a simple lap joint, the peak stresses in shear occur at the ends of the overlap. When such a joint is subjected to decreasing temperatures, the bonding material becomes progressively stiffer, increasing the non-uniformity of stress. As the peak stresses in the joint begin increasing at a faster rate than the increase in adhesive strength, the strength of the lap joint ultimately becomes lower than at normal room temperature. The strength of the bonded joint is usually unimpaired upon subsequent return to normal temperature, but the present invention provides a joint which maintains its strength at low temperatures due to a more even distribution of stress in the metal plates of the joint.

Accordingly, one object of the present invention is to provide a bonded lap joint of consistently high strength throughout a wide range of temperature.

Another object of the invention is the provision of an adhesive joint for overlapping metal plates which maintains its strength at low temperatures.

A further object of the invention is the provision of a method of producing a bonded joint as described above.

A still further object of the invention is the provision of improved means for joining two pieces of metal in lapped relationship.

Another object of the invention is to provide a high strength, bonded, metal-to-metal joint which is simple to construct.

An additional object of the invention is to provide a bonded joint for metal parts in which shear loads applied to the joint result in a substantially even stress distribution throughout the bonded area.

Further objects and advantages will become apparent or will be specifically pointed out in the following specification or in the accompanying drawings illustrating one embodiment of the invention.

In the drawings:

Fig. 1 is a side elevational view of a typical prior art lap joint illustrating, in somewhat exaggerated form, the magnitude of shear stress in the bonding layer;

Fig. 2 is a perspective view of two pieces of metal bonded together in lapped relationship according to the present invention;

Fig. 3 is an exploded side view of the joint of Fig. 2, taken on lines III—III of Fig. 2, showing the metal sheets and adhesive coatings thereon;

Fig. 4 is a view similar to Fig. 2 showing a modification of the invention; and

Fig. 5 is an illustration, showing diagrammatically the stress distribution in a lap joint according to the present invention compared to the stress distribution in a prior art joint.

The present invention provides a high strength lap joint for metal sheets in which any stress loads are substantially evenly distributed throughout the bond by perforating the end portions of the metal sheets with staggered holes which gradually decrease in size with distance from the lapping edge of the sheet. The perforated sheets are placed in overlapping position such that the perforated portion of one sheet laps and is bonded to an unperforated portion of the other sheet.

Referring to Fig. 1, metal sheets 10 and 12 are shown connected together by a film or layer of a bonding medium 14 therebetween, the joint thus formed being of a typical prior art type and being illustrated under load. The magnitude of shear stress in the medium 14 is indicated by the deviations from perpendicular of the lines drawn on the bonding medium. As load is applied, there is longitudinal displacement between the pieces 10, 12 which sets up a shear stress in the medium 14 and effects a transfer of load from one of the pieces to the other. There is elongation under load within the pieces themselves, the elongation in each piece being greatest where the load remaining in the piece is greatest. Thus, elongation in the top piece 10 must be greatest at the right end of the joint, as viewed in Fig. 1, inasmuch as this piece carries more and more of the load as movement to the right occurs. Likewise, the elongation of the bottom piece 12 is greatest at the left end of the joint. Generally, the elongation at all places, except in the mid-portion of the joint, in one of the pieces is different from the elongation at opposing places in the other piece. The difference in elongation being greatest at the ends of the joint causes maximum shear stress in the medium 14 at the ends of the joint with a minimum at the midpoint of the joint.

Fig. 2 shows a lap joint of the present invention wherein two metal sheets or plates 16 and 18 have overlapping portions 20 and 22 respectively. A perforated area 24 at the lapping edge portion of metal plate 16 extends back from the lapping edge 25 for a distance slightly less than one-half the length of the overlapping portion 20. A similar area 26 extending back from the lapping edge 27 in the lapping portion 22 of plate 18 is likewise perforated in the same manner as area 24 of plate 16. The perforations extend in rows transverse the joint and the perforations may be of any convenient shape such as round, square, oblong, oval or, as shown in Fig. 4, they may be diamond-shaped. The first row of perforations 28 may be at the extreme lapping edge 25 of metal plate 16 where they form semi-circular indentations in the lapping edge 25 resulting in a scalloped edge to the plate as shown in Fig. 2 or, alternatively, the first row of perforations 30 may be slightly spaced from the lapping edge of the plate as shown in Fig. 4. The perforations of each adjacent row are smaller in area than the perforations of the preceding row nearer the lapping edge of the plate. For example, the perforations 32 of the second row are of smaller diameter than the perforations 28, and the perforations 34 of the third row are smaller in area than the perforations 32. The perforations 32 are staggered in the plane of the metal plate 16 in relation to perforations 28, and the next subsequent row of perforations 34 are staggered in relation to perforations 32. Additional rows of perforations which are progressively smaller in area and similarly staggered in relation to the next preceding row, such as at 36, may be provided as may be necessary for particular installations.

The perforations are made progressively smaller with distance from the overlapping edges 25 and 27 in order to distribute the loads evenly back into the plates 16 and 18 respectively through the length of the overlap. It can be seen that the larger perforations near the lapping edge 25 leave a smaller area of metal near the lapping edge but that with the perforations gradually decreasing in size the remaining area of the metal plate is gradually increased with distance from the lapping edge 25. Consequently, it is evident that shear loads will be distributed through the length of the overlap by feeding back from edges 25 and 27 through gradually increasing area of each of the bonded metal plates 16 and 18 respectively.

The perforations are staggered in order to distribute any load evenly across the width of the plate. It will be noted that if the perforations were placed in line, the strip of metal plate remaining between the lines of perforations in the direction of load would act as a solid plate feeding the loads directly along its length with the part nearest the overlap absorbing most of the load. In the present invention, however, the staggered perforations provide narrow necks of metal between the perforations such as are indicated at 37, 38, and 39. Thus, loads imposed at 37 spread out into necks 38 and thence through necks 39 and through the succeeding necks of metal back to the unperforated portion 40 of the overlap. It can be seen, therefore, that the staggered perforations, with their resulting narrow necks, tend to distribute the loads across the width of the overlap.

From the above explanations it will be evident that the staggering of the perforations tends to distribute shear loads transversely across the bond while the graduating of the perforations tends to distribute the shear loads evenly through the length of the bonded overlap.

The size and spacing of the perforations would be determined for each particular installation with consideration being given to the thickness of the metal sheets, the loads expected to be encountered, additional members fastened to the sheets and other structural factors, so as to result in a regular increase in the extensional stiffness of the perforated metal plate over a length of the perforated portion of each plate sufficient to permit the load to transfer between the plates without the shear stresses at any point in the overlap exceeding the shear strength of the bond. The size and spacing of the perforations in the lapping edge portions of the plates of the present invention are selected to cause a transfer of load between plates substantially as shown by the substantially constant curve 46 in Fig. 5 wherein the ordinates represent stress concentration and the abscissae represent distance in the overlap, in contrast to the distribution of load transfer shown by curve 48 for the case of plates not having perforated edges such as the prior art joint shown in Fig. 1.

As seen in Fig. 4, the present invention may be used in a metal plate 42, perforated as at 30 and 44, bonded to an unperforated metal plate 45. This modification of the invention would be used where, for example, it is desired to attach a plate member such as 42 to a longer, and more structurally solid member such as indicated by 45 which may be a fuselage frame member, casting or the like. It can be seen in such cases that any imposed loads would be carried mainly by the attaching plate member 42 in which case it is only necessary to perforate plate 42 to obtain the even distribution of loads through use of the present invention.

After the areas 24 and 26 of the metal sheets 16 and 18, respectively, are perforated with staggered perforations of graduated size as described above, the lapping face of each metal plate is coated uniformly, as by spreading or any other convenient method, over the lapping portions 20 and 22 with a suitable adhesive 50. The metal plates are then assembled in overlapped relationship in such manner that the perforated portion 24 of plate 16 is lapped beyond the perforated portion 26 of plate 18 and covers an unperforated portion thereof. The assembly is then held forcibly in position as in a press or by C-clamps until the adhesive has set or cured.

In the lapping operation, the perforated portion of one plate is bonded to an unperforated portion of the other plate in order to provide a firm bond. It has been found to be preferable, in fact, for more even distribution of shear loads, to overlap the plates in such positions that not only does the perforated portion 24 of plate 16 overlap an unperforated portion of plate 18 and perforated portion 26 of plate 18 overlaps an unperforated portion of plate 16 but also an unperforated portion of plate 16 overlaps an unperforated portion of plate 18, in the intermediate area of the overlap as indicated by the bracket 40 in Fig. 2. It will be understood, however, that the unperforated overlapping portion 40 may be held, in some cases, to the minimum area which will prevent the perforated portions from overlapping to assure maximum bond area.

A number of adhesives are available which provide good metal-to-metal bonds but preferably the adhesive used is a thermo-setting resin and may be, for example, an adhesive of the phenol-formaldehyde type. One adhesive which has been found particularly suitable for the purpose is a two-part, thermo-setting adhesive consisting of phenol-aldehyde condensate used in conjunction with polyvinyl acetal resin in comminuted form as disclosed in Patent No. 2,499,134 dated February 28, 1950. The components of this adhesive are commercially manufactured by the Resinous Products Division of the Rohm and Haas Company, 222 W. Washington Square, Philadelphia, Pennsylvania, under the name of "Redux."

The setting of the adhesive may be accomplished by subjecting the assembled plates in forcibly held position to a temperature and for a period of time sufficient to cure the adhesive used.

It will be understood that, in the forcibly held positioning of the parts, the adhesive will flow into the perforations leaving an even film of adhesive under the unperforated portion of the metal.

It will be evident that, as a result of this invention, it has been made possible to secure a metal-to-metal bonded lap joint which has a substantially uniform shear stress distribution throughout the bonded portion. It will further be evident that it has been made possible to make a bonded lap joint simply which will retain its strength at sub-normal low temperatures.

It is to be understood that the invention is not limited to the specific embodiment herein illustrated and described but may be used in other ways without departure from its spirit as defined by the following claims.

What is desired to secure by Letters Patent is:

1. A lap joint between overlapping edge portions of two metal plates, each of said edge portions extending from an edge of its plate, said edge portion of one of said plates having a perforated portion immediately adjacent said edge of its plate provided with a plurality of spaced rows of spaced apertures, the apertures of each of said rows being smaller than the apertures of an adjacent row disposed nearer said edge of said one of said plates for progressively weakening said perforated portion increasingly towards said edge of its plate whereby shear stresses are distributed away from said overlapped edges, the apertures of each of said rows being in staggered relation to the apertures of an adjacent row of apertures whereby shear stresses are distributed transversely over said overlapped edge portions, said perforated portion of said edge portion of said one of said plates being adhesively bonded to the other of said plates.

2. A lap joint for evenly distributing shear loads between overlapping edge portions of two metal plates, a layer of adhesive between said overlapping edge portions bonding said plates together, each of said edge portions extending from an edge of its plate, each of said edge portions having a perforated portion immediately adjacent said edge of its plate provided with a plurality of spaced rows of spaced apertures, the apertures of each of said rows being smaller than the apertures of an adjacent row disposed nearer said edge of its plate for progressively weakening said perforated portion increasingly toward said edge of its plate whereby the shear stresses are distributed away from the said edge of said plate, the apertures of each of said rows being in staggered relation to the apertures of an adjacent row of apertures whereby the stress of shear loads on said joint are distributed transversely of said overlapping edge portions, said perforated portion of each of said edge portions being adhesively bonded to an unperforated portion of the other of said overlapping edge portions.

3. A lap joint for distributing loads between overlapping edge portions of two metal plates, a layer of adhesive between said overlapping edge portions bonding said plates together, each of said edge portions extending from an edge of its plate, each of said edge portions having a perforated portion immediately adjacent said edge of its plate provided with a plurality of spaced rows of spaced apertures, the apertures of each of said rows being smaller than the apertures of an adjacent row disposed nearer said edge of its plate for progressively weakening said perforated portions increasingly towards said edge of its plate whereby the stress of shear loads applied to said joint are distributed away from said overlapping edges, the apertures of each of said rows being in staggered relation to the apertures of an adjacent row of apertures for distributing the stress of shear loads transversely of said joint, said perforated portion of each of said edge portions being adhesively bonded to a first unperforated portion of the overlapping edge portion of the other of said plates, each of said overlapping edge portions having a second unperforated portion extending between its said perforated portion and its said first unperforated portion, said second unperforated portion of each of said overlapping edge portions being adhesively bonded to said second unperforated portion of the other of said overlapping edge portions.

4. A method of making a bonded lap joint between the overlapping edges of two pieces of metal comprising the steps of perforating the end portion of each piece of metal, coating the overlapping portions thereof with adhesive, assembling the coated metal pieces in overlapping relationship whereby the perforated portion of one piece extends beyond the perforated portion of the other piece and forcibly maintaining said metal pieces in assembled position until said adhesive has set.

5. A method of making an improved bonded lap joint between overlapping ends of plates of metal comprising the steps of perforating the portion adjacent the end of each metal plate with spaced rows parallel to the end of said plate of spaced perforations progressively smaller in area with distance from said end of said plate, applying an adhesive to the overlapping portions of said metal plates, overlapping said coated portions of said metal plates in a position whereby the perforated portions of each plate overlap an unperforated portion of the other plate, and curing said adhesive.

6. In a lap joint forming a load-transmitting connection between two metal plates, the overlapping ends of each of said plates having a perforated portion adjacent the end thereof, a first unperforated portion extending from said perforated portion and a second unperforated portion extending from said first unperforated portion, said perforated portions of each plate overlapping the second unperforated portion of the other plate and said first unperforated portion of each plate overlapping the first unperforated portion of the other plate, said perforated portion of each plate comprising spaced rows parallel to said end of said plate of spaced perforations, the perforations of each row being progressively smaller in area than the perforations of the next adjacent row nearer said end of said plate and staggered with respect to the perforations of the adjacent rows, and a layer of adhesive bonding said overlapping ends.

7. In a lap joint forming a load-transmitting connection between two metal plates having adhesively bonded overlapping portions adjacent the edges of said plates, the said overlapping portions of each plate having a weakened portion immediately adjacent said edge of its plate including spaced rows parallel to said edge of said plate of spaced apertures, the apertures of each of said rows being smaller than the apertures of an adjacent row disposed nearer said edge of said plate and the apertures of each of said rows being in staggered relation to the apertures of an adjacent row of apertures, a first unweakened portion remote from said edge and a second unweakened portion more remote from said edge than said first unweakened portion, and a layer of adhesive bonding the weakened portion of each plate to the second unweakened portion of the other plate whereby the stress of shear loads is transmitted through the plate remaining around said apertures to the overlapped first unweakened portion of both plates.

8. A method of making an improved bonded lap joint between the ends of overlapping plates of metal each having a perforated portion immediately adjacent the end of the metal plate perforated with spaced rows parallel to said end of said plate of perforations progressively smaller away from said end of said plate, a first unperforated portion and a second unperforated portion, the steps of applying an adhesive to coat the overlapping portions of said metal plates, overlapping said coated portions of said metal plates in a position whereby the perforated portion of each plate overlaps the second unperforated portion of the other plate, and curing said adhesive.

References Cited in the file of this patent

UNITED STATES PATENTS

| Number | Name | Date |
| --- | --- | --- |
| 1,219,151 | Reed | Mar. 13, 1917 |
| 1,303,027 | Carr | May 6, 1919 |
| 1,377,671 | Dieckmann | May 10, 1921 |
| 1,859,468 | Repony | May 24, 1932 |
| 2,182,169 | Bierer | Dec. 5, 1939 |
| 2,207,240 | Cornwell | July 9, 1940 |
| 2,344,722 | Pasquier | Mar. 21, 1944 |
| 2,415,881 | Heftler | Feb. 18, 1947 |
| 2,427,229 | Riley | Sept. 9, 1947 |
| 2,452,739 | Fairchild | Nov. 2, 1948 |
| 2,460,181 | Marshall | Jan. 25, 1949 |
| 2,540,252 | Fischer | Feb. 6, 1951 |

FOREIGN PATENTS

| Number | Country | Date |
| --- | --- | --- |
| 664,251 | France | Apr. 22, 1929 |